(No Model.)
D. G. WEEMS.
ARTIFICIAL STONE.
No. 274,237.    Patented Mar. 20, 1883.
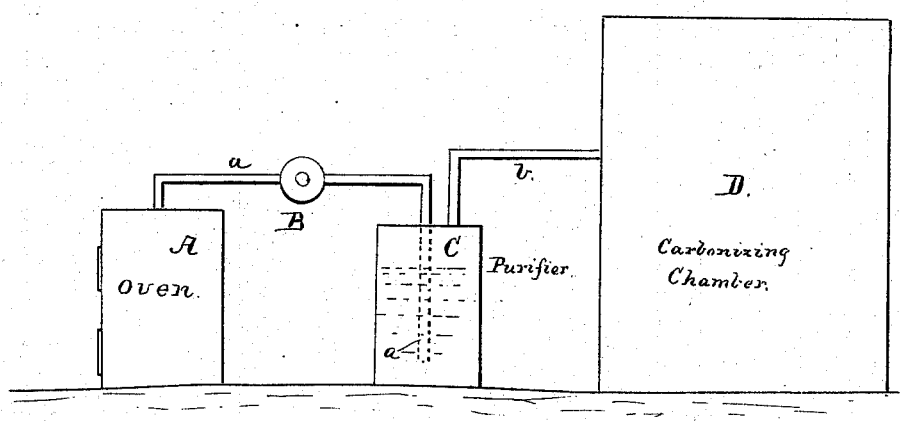
WITNESSES
INVENTOR
D. G. Weems.
Attorney

UNITED STATES PATENT OFFICE.

DAVID G. WEEMS, OF BALTIMORE, MARYLAND.

ARTIFICIAL STONE.

SPECIFICATION forming part of Letters Patent No. 274,237, dated March 20, 1883.

Application filed October 10, 1881. (No model.)

*To all whom it may concern:*

Be it known that I, DAVID G. WEEMS, of Baltimore city, State of Maryland, have invented certain new and useful Improvements in the Manufacture of Artificial Stone; and I hereby declare the same to be fully, clearly, and exactly described as follows:

My invention has reference to the manufacture of artificial stone, into which enters as an ingredient any one or more of the standard and well-known calcareous cements; and it has for its object to render the stone harder and more durable than has heretofore been possible, following the usual and well known methods.

It has long been known that slabs, tiles, pipes, or other articles formed, in whole or in part, of mixtures of sand and cement are rendered, in a short time, if subjected to the action of carbonic-acid gas, as hard as they would otherwise become only after the lapse of considerable time. It has been generally customary to place the articles, while fresh from the molds and still damp, in a chamber into which were conducted the products of combustion from a suitable furnace. The gases so produced are quite hot as they enter the chamber, and are anything but pure, being a mixture of carbonic acid, carbonic oxide, water-vapor, and nitrogen, besides containing all the natural impurities of the air and fuel—such as traces of sulphureted hydrogen and sulphurous acid—together with soot, cinders, and mechanical impurities from the furnace.

It has been commonly noticed that artificial stone as usually hardened by the action of carbonic-acid gas is streaked or discolored with spots or blotches, which render the stone less desirable for exposed work, and especially for facings and ornamental trimmings. It has also been noticed that in thus hardening imitation Egyptian, Tennessee, and other handsome marbles, in which various mineral coloring-matters are employed, the brilliancy of the same is impaired. For this reason the carbonization of such articles is commonly omitted. I have discovered that this discoloration is owing to the presence of sulphureted hydrogen, soot, cinders, and other impurities found in the carbonic-acid gas and carried by it from the generating-chamber to the hardening-compartment; and I have further discovered that by passing the gas under and through a body of water it can be thoroughly cleansed of all its injurious properties, and this, too, without impairing in the least its hardening quality, or interfering in any manner with the operation. The soot, cinders, and other mechanical impurities are deposited in the water, and the sulphureted hydrogen, which acts upon and impairs the brilliancy of the mineral coloring-matter of fancy marbles, is fully dissolved in and arrested by the water.

In the drawing is shown in elevation the apparatus I use. In it A is the oven, connected by a pipe, *a*, with the water-seal or purifier C, whence a pipe, *b*, leads to the carbonizing-chamber D. A blower, B, serves to draw the products of combustion and force them through the water.

In operation a fire is built in the oven A, the blower is set in motion, and the stones to be treated are placed in the building D. The gas is caused to bubble through the water seal or trap C, removing mechanical impurities and cooling the gas, which is then conducted into the chamber D, in which the stone is placed. The gas, being cold, retards the drying of the stones, and the water mechanically held by them absorbs the carbonic-acid gas, causing it to penetrate the stones to a much greater depth than it would were the gas heated.

The gas may be prepared by action of an acid on a carbonate, or by calcination, if preferred.

The carbonization is rapidly effected and far more thoroughly than has heretofore been possible.

The water used to purify the gas contains, being a saturated solution and cold, nearly its own volume of carbonic-acid gas. Except mechanical impurities, which are readily removed by subsidence or filtration, it contains little or nothing else, and may be considered a pure saturated solution of carbonic acid in water. This I use instead of water for dampening the cement, and also use it in the form of a wash to harden the stone after formation and partial or complete drying.

I am fully aware of the inventions described and claimed in the patents of James Rowland, of D. W. Sprogle, and of George Richardson, in which carbonic-acid gas, either alone or mixed with steam or water, and in various ways, is employed for the purpose of hardening artificial stone. I wish, therefore, to be distinctly understood as making no claim to the matters and things therein set forth. I am further aware that it is common to wash various kinds of gas before using the same, and am informed that carbonic-acid gas used in bread-making has been washed to relieve it of impurities which might injure the bread. I am not aware, however, that prior to my invention it has been known that the blotches and discolorations of artificial stone were the result of impurites of the gas, nor that these impurities were of such a character that they could be thoroughly removed by water, and this, too, without impairing the hardening process.

What I claim is—

1. The method herein described of hardening artificial stone, the same consisting in preparing a supply of carbonic-acid gas, substantially in the manner described, conducting said gas through and under the surface of a body of water, whereby all impurities are removed and the gas is cooled, and finally conducting said purified and cooled gas into the hardening-chamber containing the stone, substantially as described.

2. The apparatus for hardening artificial stone herein described, consisting of a gas-generating chamber for carbonic-acid gas, a water-seal for arresting the impurities of the gas, and a hardening-compartment wherein the stone is subjected to the action of the purified gas, substantially as described.

DAVID G. WEEMS.

Witnesses:
GEO. R. GAITHER, Jr.,
GEO. A. HEMMICK.